G. A. SODEN & J. W. POWELSON
FRONT DRIVE AUTOMOBILE CONSTRUCTION.
APPLICATION FILED JAN. 29, 1914.
1,114,815.
Patented Oct. 27, 1914.
3 SHEETS—SHEET 1.
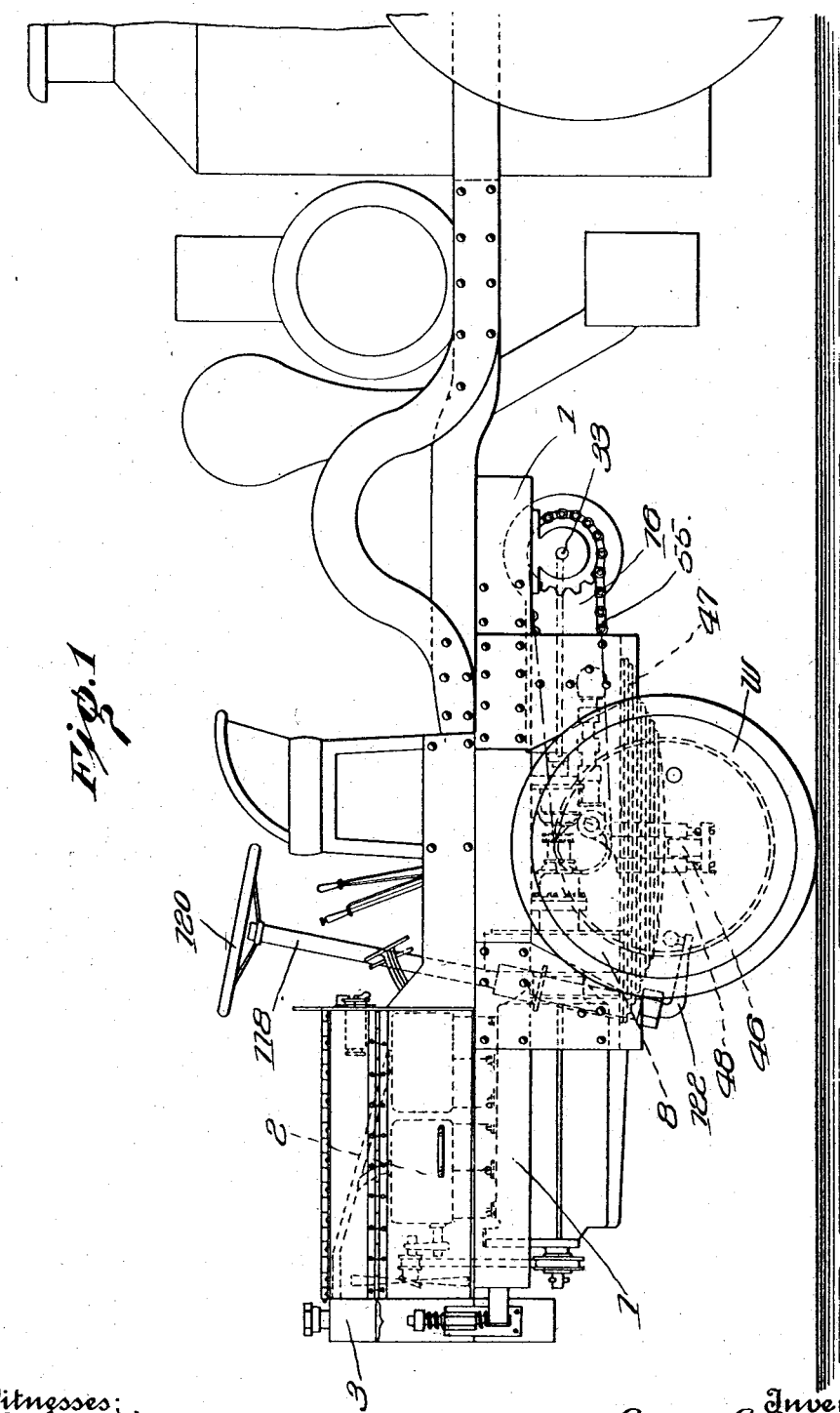

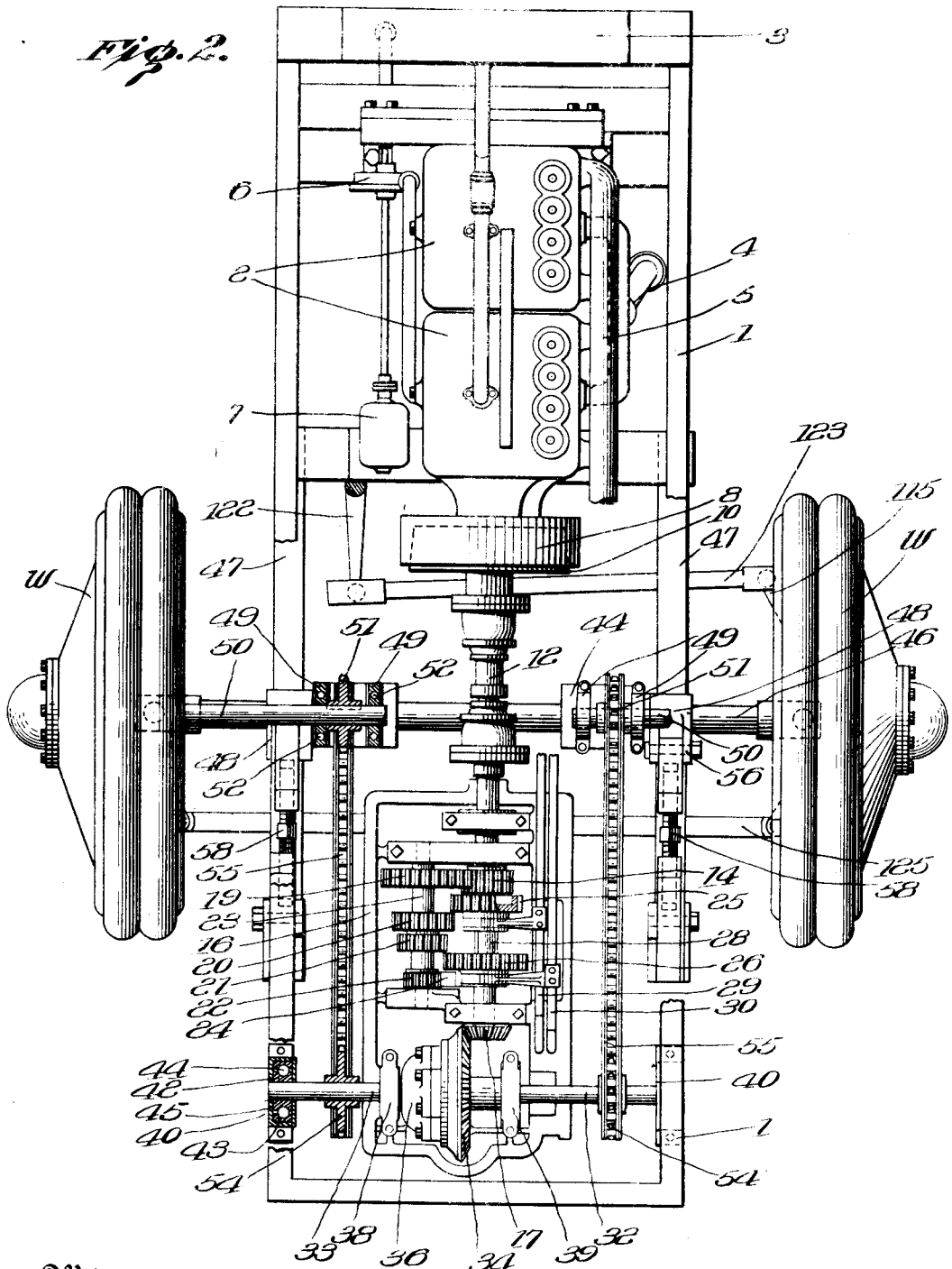

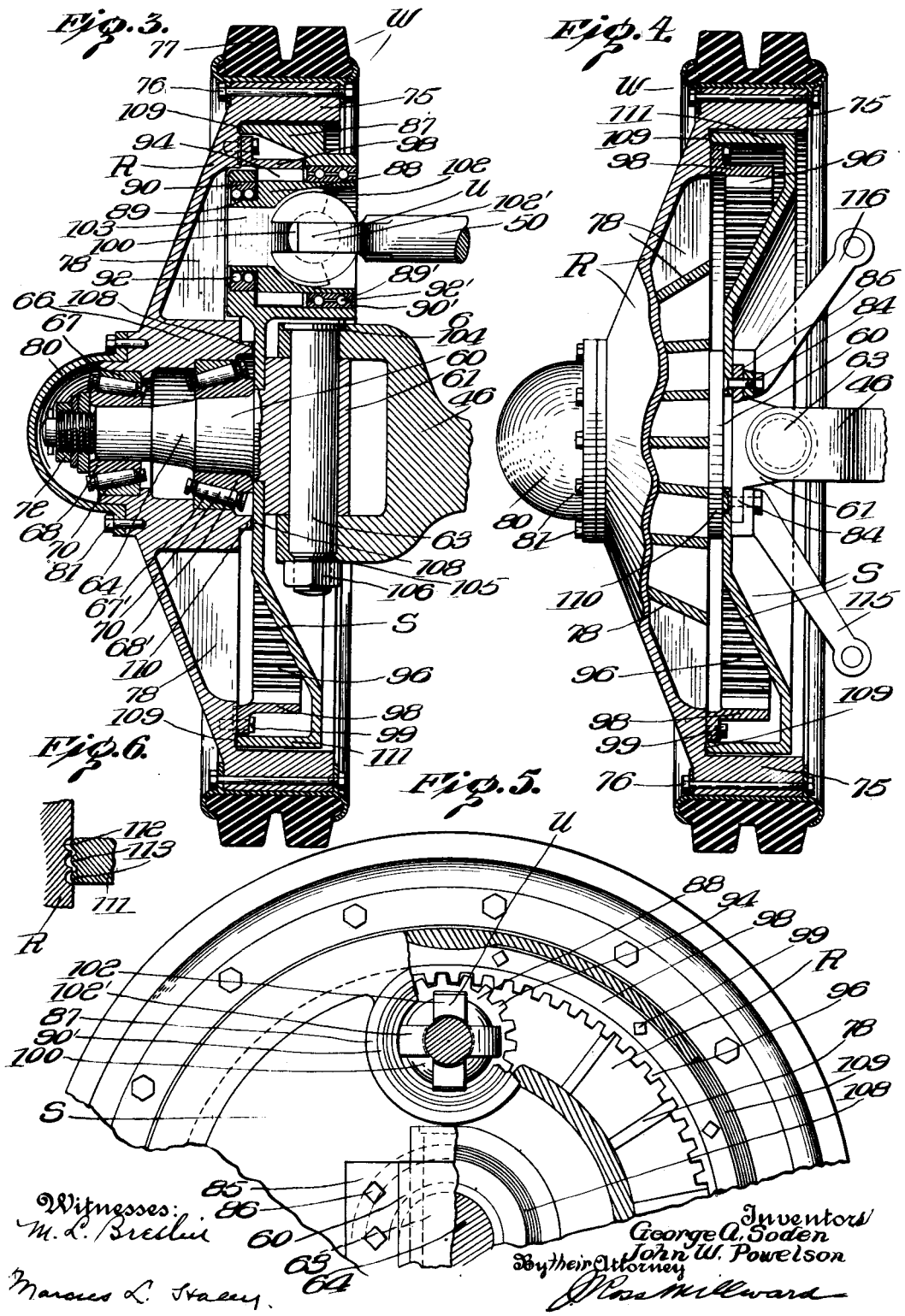

UNITED STATES PATENT OFFICE.

GEORGE A. SODEN, OF EAST ORANGE, AND JOHN W. POWELSON, OF NEWARK, NEW JERSEY.

FRONT-DRIVE-AUTOMOBILE CONSTRUCTION.

1,114,815.    Specification of Letters Patent.    Patented Oct. 27, 1914.

Application filed January 29, 1914. Serial No. 815,164.

*To all whom it may concern:*

Be it known that we, GEORGE A. SODEN and JOHN W. POWELSON, citizens of the United States, residing at East Orange and Newark, respectively, in the county of Essex and State of New Jersey, have invented new and useful Improvements in Front-Drive-Automobile Construction, of which the following is a specification.

This invention relates to improvements in front drive automobile construction or tractors wherein the driving power from the motor is transmitted through the front wheels in a manner likewise enabling them to be employed for steering of the vehicle in the usual manner by turning of the wheels about a vertical pivot.

As hereinafter disclosed important features of the present invention consist in an improved organization and construction whereby the driving forces are applied in a most direct manner without dissipation of power and the production of destructive lateral stresses; in an improved arrangement and form of driving wheel of particularly strong construction wherein certain of the parts have a juxtaposed relation to insure against displacement and consequent damage therefrom.

A further important feature resides in provision for retaining of the lubricant within the wheel and the specific means employed to that end. This latter feature is particularly desirable as applied to the driving wheels of fire-steamers wherein the herein disclosed type of drive-wheel is largely used. Owing to the long periods during which the steamers stand idle in the fire-houses this leakage of the oil is a considerable and troublesome factor.

These and other features of our invention are shown in the accompanying drawings in which the reference numerals of this description are applied to corresponding parts in the several views.

In the drawings Figure 1 shows in side elevation a desirable embodiment of our invention as employed for the motive power of a fire-engine or steamer. Fig. 2 is a partial plan view of the foregoing with portions broken away and illustrating various features of the invention; Figs. 3 and 4 are respectively vertical and horizontal cross-sectional views of our improved wheel construction, the latter having certain of the parts shown in plan; Fig. 5 is an inner side elevational view showing a portion of the wheel and having a portion of the inner wheel flange broken away better to show certain features, and Fig. 6 is a detail sectional view of the oil retaining grooves.

In Figs. 1 and 2 is shown a two wheel tractor arrangement the general features of which comprise a suitable supporting frame 1 upon which is carried the driving motor 2 shown of four cylinder internal combustion type having associated therewith the usual radiator 3, carbureter and exhaust 4 and 5, pump 6, generator 7 etc. Upon the engine crank shaft is carried the usual flywheel and outer clutch member 8 engaged in a customary manner by an inner clutch member 10 rotatively connected to a transmission drive-shaft 12 having thereon a gear 14 within the usual transmission case or gear-box 16. From the gear 14 the driving power is transmitted rearwardly to a driving miter gear 17 through a selective gearing arrangement comprising gears 19, 20, 21 and 22 fixed on a counter shaft 23, a reversing gear 24 and sliding gears 25 and 26 rotatively secured on driven shaft 28 upon which miter gear 17 is secured. The sliding gears 25 and 26 are operated by the rods 29 and 30 respectively.

As shown in our improved construction the engine crank-shaft and the transmission shafts are in desirable axial alinement and the driving power therefrom is communicated through the miter drive gear 17 to the right and left differential shafts 32—33 respectively by the engagement of the miter gear 17 with a similar larger gear 34 on a differential casing 36. The driving motion is distributed to the respective shafts 32 and 33 through the well known differential gearing within the casing 36. The described shafts 12, 23 and 28 as illustrated have suitable bearings within the transmission case 16.

The differential shafts 32—33 as illustrated in Fig. 2 are arranged crosswise of the chassis frame 1 and in accordance with our invention are supported in suitable bearings 38—39 in the crank case and at their outer ends are supported by additional ball bearings 40 on the frame 1 whereby they are rigidly supported against bending strains. The bearings 40 comprise the inner and outer ball races 42—43 having therebetween the bearing balls 44. The outer race bearing is carried in a suitable casting 45 bolted to the under part of frame member 1.

The supporting frame carrying the machinery described is resiliently mounted upon the axle 46 by having secured to its under portion the oppositely arranged leaf spring 47—47 resting upon the axle. Suitably clamped upon the axle at each side is a securing and bearing yoke 48. As best shown in Fig. 2 each of these yokes 48 is formed to provide opposite bearings 49 for the wheel drive shafts 50 mounted therein and having fixed thereon between the bearings 49, sprocket wheels 51. The bearings are shown having outer ball races for ball bearings 52 interposed between said outer races and inner coacting ball races on the drive-shafts.

Upon the differential shafts 32—33 are secured the sprocket wheels 54—54 in alinement with the drive-shaft sprockets 51 and upon the sprockets are carried the driving chains 55—55 for transmitting the power to the drive-shafts. For the purpose of loosening or tightening of the chains the yokes 48 are provided with ears 56 to which are pivotally attached turnbuckle connections 58 pivotally attached at their opposite ends to the frame 1. Adjustment of the turnbuckle will produce a slight forward or rearward movement of the axle 46 and the drive-shafts 50 with relation to the sprockets 54 whereby the chain is tightened or loosened as desired.

Upon the axle 46 are mounted the improved traction wheels W of our invention which are adapted to be driven by the respective drive shafts 50 and are likewise capable of being turned to direct the course of the vehicle.

The characteristic features of our improved wheel construction are shown in Figs. 3 to 6. As there shown the wheel is composed of an outer rotary wheel member R and an inner non-rotary wheel member S. The wheel so formed is carried upon a pivotal wheel axle member 60 pivotally secured to the axle 46 which has its ends forked in the manner shown to receive the bearing portion 61 of the axle member 60. The bearing 61 is journaled upon the pivotal bearing pin 63 so that the axle member 60 and the wheel carried thereon is enabled to be turned in a horizontal plane about the pin 63 for steering purposes.

The rotary wheel member R is journaled upon the horizontal spindle or axle 64 of the member 60, for this purpose having thereon an integral hub flange 66. Upon the interior of the hub flange, annular bearing rings 67—67' are provided to co-act with suitable annular bearing rings 68—68' on the spindle 64, in forming reversely inclined raceways for the roller bearings 70 of an approved form. Locking nuts 72 are threaded to the end of the spindle as shown to retain this outer wheel member in position on its axle. At the peripheral part of the rotary wheel member R is the integral flange 75 or tread portion of the wheel which has secured thereto by bolts 76 the usual cushion tire or tread 77. The intermediate portion of the rotary wheel member R desirably is of the inclined web construction shown having integrally formed on its inner surface the spokes or reinforcing ribs 78. A cover plate 80 is bolted to the member R by bolts 81 as a protection for the roller bearing.

The inner or stationary wheel member S is secured directly to the pivotal member 60 by means of bolts 84 passed inwardly through the member S and the shoulders 85 integrally formed at the sides of the member 60. Clamping nuts are arranged on the ends of the bolts. As best shown in Figs. 3 and 5 the inner stationary wheel member S is formed with a cylindrical bearing flange 87 vertically above and in a line with the pivot pin 63.

The driving of the outer or rotary wheel member R is effected by a drive pinion 88 journaled within the bearing flange 87. The pinion is shown provided at each side with flanges for the annular inner ball-races 89—89' coacting with outer annular races 90—90' to form raceways for the oppositely arranged ball bearings 92—92'. As best shown in Figs. 3 and 5 the teeth 94 of the pinion mesh with internal teeth 96 of a large annular gear 98 secured by bolts 99 to the outer rotary wheel member R whereby the outer member is rotated to propel the vehicle.

The driving force is imparted to the pinion of each wheel from the wheel drive-shafts 50 through a universal joint U arranged in vertical alinement with the pivotal pin 63 so that the driving force is transmitted to the pinion 88 in the different positions assumed by it as the wheel is turned. The universal joint is shown composed of a spherical element 100 provided with grooves in right angular relation to which are fitted the forks 102—102' respectively. The forks 102 are integral with a squared connecting piece 103 fitted to a corresponding aperture in the pinion 88 whereby they are keyed together and the forks 102' desirably may be formed integral with the drive-shafts 50 as disclosed.

An important feature of our invention resides in the relative positioning and arrangement of certain of the parts whereby disastrous displacement of the parts are insured against. Referring particularly to Fig. 3 the pivotal pin 63 will be seen to be formed to provide shoulders 104—105 resting upon coacting ledges of the fork of axle 46 and the pin is threaded at its lower end to receive a clamping nut 106 to retain it in position. Thus the pin 63 by its arrangement is prevented from dropping should its clamping nut become dislodged. An important further precaution against displacement of the pin is furnished by our improved construction wherein a portion of the stationary wheel member S is arranged to overlie the upper end of the pin 63 so that it cannot become upwardly displaced into engagement with the moving parts nor dislodged from its securing position. Thus the assembling of the stationary member S upon the axle member 60 positively will lock the pin 63 in position.

An additional important feature of the present invention resides in the employment of an improved arrangement to prevent the undesirable leakage of the lubricant from the wheels. This we have accomplished by the formation of annular grooves in one wheel member having entering therein annular beads or tongues on the other of the members. As here shown we have provided for so checking the leakage of the oil at two points in the wheel, namely at the inner and outer positions indicated at 108 and 109. At the point 108 an inwardly extended flange 110 of the hub 66 is in close proximity to the face of the stationary member S and at its periphery the member S is shown with a horizontally extended flange 111 so as to inclose the gear 96 and the edge of this flange 111 is in close proximity to a face of the rotary member R. These opposed faces of the members R and S at points 108 and 109 are provided with coacting tongues and grooves in the manner best shown in Fig. 6 where as shown the grooves 112 are enlarged so as freely to receive the tongues 113 of the other member. The oil collecting in the grooves, of which three as shown may desirably be employed, has been found to be particularly effective in checking the gravitating thereof and its consequent objectionable leaking upon the floor.

The bolts 84 in addition to securing the member S to the axle member 60 are arranged likewise to secure to the wheel the respective forward and rearward steering arms 115—116. The turning of the wheels about the pins 63 for steering is effected from the usual steering column 118 by the operation of steering wheel 120; the movement therefrom being transmitted from steering arm 122 by reach rod 123 to forward arm 115 for turning of the right-hand wheel which is connected by distance rod 125, connected to the rear arms 116 of each of the wheels.

Having described our invention we claim,—

1. A traction wheel arrangement of the character described having a pivotal supporting member, a rotary member journaled thereon, a hub flange on the rotary member having its inner end formed with annular oil collecting grooves, a gear carried by the rotary member, a stationary wheel member supported on the pivotal member, a pinion journaled in the stationary member in driving engagement with the gear, a flange on the stationary member surrounding the gear, and annular beads on the stationary member arranged freely to enter the annular grooves of the hub flange.

2. A traction wheel arrangement of the character described having a pivotal supporting member, provided with a spindle portion, a rotary wheel member journaled on the spindle, a hub flange on the rotary member having its inner end provided with annular oil collecting grooves, an internal gear carried by the rotary member, a stationary wheel member supported on the pivotal member, a pinion journaled in the stationary member in driving engagement with the gear, a flange on the stationary member surrounding the gear, and provided with annular beads at its edge, said rotary member being formed with annular grooves freely to receive the beads of the stationary member and annular beads on the stationary member arranged freely to enter the grooves of the hub flange.

3. A traction wheel arrangement of the character described comprising a supporting axle having its end suitably apertured for the reception of a pivot pin, a pivot pin fitted to the aperture, a stationary wheel member journaled on the pivot pin to be capable of movement about said pin in a horizontal plane and a rotatable wheel member journaled on the stationary member, said stationary member having a portion thereof arranged to overlie the pivotal pin to prevent its withdrawal.

4. A traction wheel arrangement of the character described comprising a supporting axle having a forked end suitably apertured, a vertically arranged pivot pin fitted to the apertures to rest upon the axle a wheel axle member journaled on the pin to swing in a horizontal plane, a spindle on the axle member, a rotatable wheel member journaled on the spindle, a gear carried by the rotatable member, a stationary wheel member, a bearing flange on the stationary member and a pinion journaled in said flange in driving engagement with the gear, said bearing flange being arranged to overlie the pivot pin thereby to prevent withdrawal of the pin.

5. A traction wheel arrangement of the character described comprising a supporting axle having a forked end suitably apertured to provide shoulders therein, a vertically arranged pivot pin fitted to the apertures and formed to seat upon the shoulders and with a threaded lower end, a retaining nut on the lower end, a wheel axle member journaled on the pin to swing in a horizontal plane, a spindle on the axle member, a rotatable wheel member journaled on the spindle, a gear carried by the rotatable member, a stationary wheel member, a bearing flange on the stationary member and a pinion journaled in said flange in driving engagement with the gear, said bearing flange being arranged to overlie the pivot pin thereby to prevent withdrawal of the pin.

In testimony whereof we have signed our names to this specification in the presence of two subscribing witnesses.

GEORGE A. SODEN.
JOHN W. POWELSON.

Witnesses:
J. O. REARS,
WM. MESSERSCHMIDT.